(12) United States Patent
Fujinuki

(10) Patent No.: US 8,424,889 B2
(45) Date of Patent: Apr. 23, 2013

(54) VEHICLE-BODY STIFFENING DEVICE

(75) Inventor: Tetsuo Fujinuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/176,046

(22) Filed: Jul. 5, 2011

(65) Prior Publication Data

US 2012/0007387 A1    Jan. 12, 2012

(30) Foreign Application Priority Data

Jul. 6, 2010 (JP) ................. 2010-154239

(51) Int. Cl.
*B62D 21/11* (2006.01)
*B62D 37/02* (2006.01)
*B60G 21/05* (2006.01)

(52) U.S. Cl.
USPC .......... 280/124.1; 280/124.106; 280/124.109; 280/124.137; 280/124.147; 280/124.155; 296/180.1

(58) Field of Classification Search ............... 280/5.502, 280/5.506, 5.507, 5.511, 5.512, 124.106, 280/124.107, 124.109, 124.13, 124.131, 280/124.137, 124.149, 124.152, 124.166, 280/124.147, 124.155; 296/180.1, 192, 203.02
See application file for complete search history.

(56) References Cited

U.S. PATENT DOCUMENTS

| | | | | |
|---|---|---|---|---|
| 1,931,105 A | * | 10/1933 | Crawford et al. | 301/124.1 |
| 4,165,099 A | * | 8/1979 | Wagner et al. | 280/124.116 |
| 4,943,092 A | * | 7/1990 | Haraguchi | 280/124.109 |
| 5,597,175 A | * | 1/1997 | Tuan | 280/124.111 |
| 6,708,994 B2 | * | 3/2004 | Etzold | 280/124.106 |
| 7,762,568 B2 | * | 7/2010 | Tatsumi et al. | 280/124.137 |
| 2005/0258613 A1 | * | 11/2005 | Kleckner | 280/124.107 |

FOREIGN PATENT DOCUMENTS

| | | |
|---|---|---|
| JP | 2006-182133 A | 7/2006 |
| JP | 2008-290552 A | 12/2008 |

* cited by examiner

*Primary Examiner* — Joseph Rocca
(74) *Attorney, Agent, or Firm* — McDermott Will & Emery LLP

(57) ABSTRACT

In a vehicle-body stiffening device, a wind-receiving plate that receives traveling wind is fixed to a main bar portion of a lower bar that connects brackets formed at left and right lower sections of a suspension cross member to each other and supporting suspension lower arms. The wind-receiving plate receiving a traveling-wind pressure biases the main bar portion so as to generate bending stress. Due to this bending stress, a preload is generated between the left and right brackets. Since the preload is generated by the traveling-wind pressure, the preload is 0 (kg/mm) when the vehicle speed is 0 (km/h), but increases as the vehicle speed increases.

6 Claims, 9 Drawing Sheets

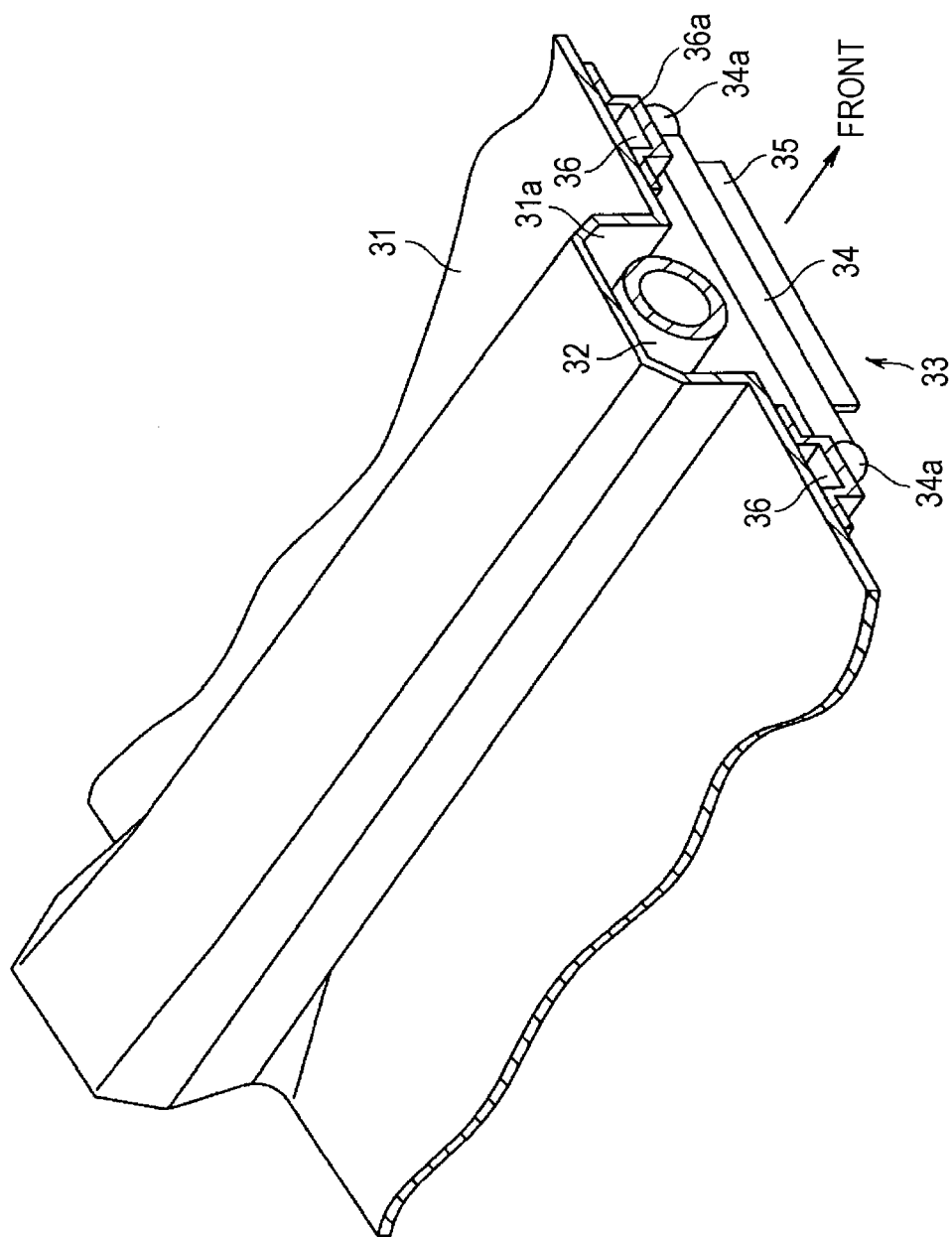

VEHICLE-BODY STIFFENING DEVICE

CROSS-REFERENCE TO RELATED APPLICATIONS

The present application claims priority from Japanese Patent Application No. 2010-154239 filed on Jul. 6, 2010, the entire contents of which are hereby incorporated by reference.

BACKGROUND OF THE INVENTION

1. Field of the Invention

The present invention relates to a vehicle-body stiffening device that uses traveling wind to apply a preload to a stiffening member, which connects regions of a vehicle body to each other, so as to increase the rigidity of the vehicle body.

2. Description of the Related Art

It is commonly known that when a vehicle, such as an automobile, is cornering or slaloming at high speed, a vertical pressing force on a support portion that supports a suspension is transmitted to the vehicle body without being sufficiently absorbed by the suspension, causing bending deformation to occur in the vehicle body. In this case, if the rigidity of the vehicle body is low, a phase lag in the bending deformation (vehicle-body hysteresis) occurs significantly, giving the driver an impression of poor steering responsiveness (vehicle tracking properties) due to a lack of unity between steering maneuverability and vehicle behavior.

Although increasing the rigidity of the vehicle body can reduce the vehicle-body hysteresis, this can lead not only to a higher price of the product as well as lower fuel efficiency due to an increased vehicle weight, but also to reduced riding comfort due to an increased sense of ruggedness when the vehicle is running.

In light of this, a technique of locally increasing the rigidity of relevant regions of the vehicle body by stiffening these relevant regions using stiffening members is widely employed. For example, Japanese Unexamined Patent Application Publication No. 2008-290552 (hereinafter referred to as "Patent Document 1") discloses a vehicle-body stiffening device in which an expandable-contractible stiffening member (connecting member) connects shafts provided at opposite ends of a suspension cross member in the vehicle-width direction and supporting bases of suspension arms so that the rigidity of the suspension cross member can be increased. In addition, the vehicle-body stiffening device includes biasing means configured to constantly bias the shafts toward each other by applying a preload (kg/mm) thereto using a spring pressure.

Japanese Unexamined Patent Application Publication No. 2006-182133 (hereinafter referred so as "Patent Document 2") discloses a vehicle-body stiffening device that locally increases the rigidity of the vehicle body by using a stiffening member (strut, tower bar) to connect strut, support portions that support upper sections of strut, suspensions provided at left and right sides in the vehicle-width direction. In addition, in the vehicle-body stiffening device, biasing means configured to apply a bias force in the expanding-contracting direction by using a gas pressure is provided at an intermediate position of a main bar portion so as constantly apply a preload between the strut support portions. Moreover, Patent Document 2 also discloses a technique of attenuating the expansion and contraction of the stiffening member by using an oil damper provided in the biasing means.

With the vehicle-body stiffening device disclosed in each of Patent Documents 1 and 2, since the biasing means constantly applies a preload to the members spaced apart from each other, the vehicle-body hysteresis can be effectively reduced.

However, in the vehicle-body stiffening device equipped with the biasing means disclosed in each of Patent Documents 1 and 2 described above, the device needs to be installed between the aforementioned members in a state where the preload generated by the biasing means is suppressed or in a state where a jig that suppresses the preload is attached. The former involves a time-consuming installation process, whereas the latter requires a process for removing the jig after the installation. In either case, the process is complicated. Moreover, the preload generated by the biasing means tends to weaken with time, which is problematic in terms of durability.

Although the vehicle-body hysteresis maintains its initial state when the vehicle is at a stop and is thus substantially 0 (%), the vehicle-body hysteresis increases with increasing vehicle speed. However, because the preload is set at a fixed value by the biasing means in the techniques disclosed in Patent Documents 1 and 2 described above, if the steering responsiveness in a high-speed running mode is to be enhanced by, for example, setting the preload characteristics to a high-speed side, the preload is excessively applied, to the vehicle body during a low-speed to mid-speed running mode. This results in reduced riding comfort when the vehicle is running at low to mid speed.

SUMMARY OF THE INVENTION in view of she circumstances described above, an object of the present invention is to provide a vehicle-body stiffening device that is capable riot only to facilitate the assembly process by allowing for installation in a state where a preload is not generated, but also to generate a bias force in accordance with the vehicle speed.

In order to achieve the aforementioned object, a vehicle-body stiffening device according to the present invention includes a stiffening member that connects spaced-apart regions of a vehicle body; and a wind-receiving plate that is fixed to the stiffening member and that receives a traveling-wind pressure, the wind-receiving plate being configured to bias the stiffening member by receiving the traveling-wind pressure so as to generate a preload between the spaced-apart regions.

According to the present invention, the wind-receiving plate is fixed to the stiffening member that connects the spaced-apart regions of the vehicle body. Thus, when the wind-receiving plate receives the traveling-wind pressure and biases the stiffening member, a preload is generated between the spaced-apart regions via the stiffening member. Since this preload is generated by the traveling-wind pressure, the stiffening member can be installed without the preload being generated between the spaced-apart regions at the time of installation, thereby facilitating the assembly process.

Furthermore, the preload changes in accordance with the traveling-wind pressure generated when the vehicle is running. Therefore, when the vehicle is running at high speed, good steering responsiveness can he achieved due to high preload characteristics. On the other hand, when the vehicle is running at low to mid speed, good riding comfort can be ensured due to low preload characteristics.

BRIEF DESCRIPTION OF THE DRAWINGS

FIG. 5 is a perspective view showing a state where a floor tunnel is stiffened by a lower bar according to a third embodiment;

DESCRIPTION OF THE PREFERRED EMBODIMENTS

Embodiments of the present invention will be described below with reference to the drawings.

First Embodiment

Figure 1:
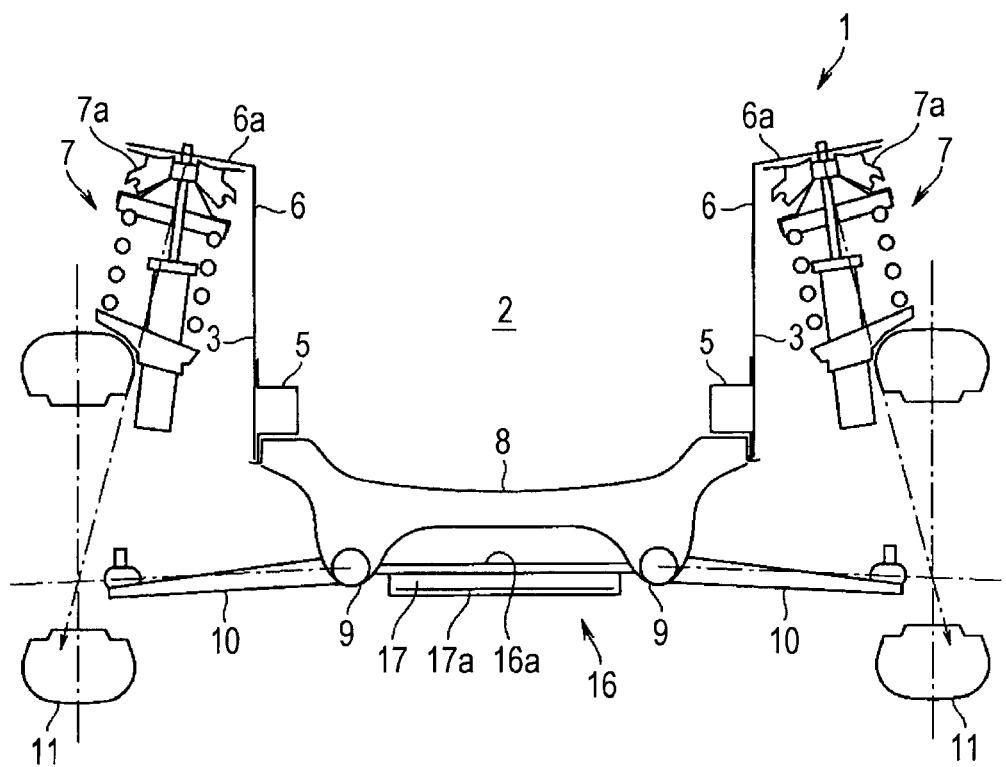
FIG. 1 is a front view showing a state where a lower bar according to a first embodiment is attached to a suspension cross member.
Figure 2:
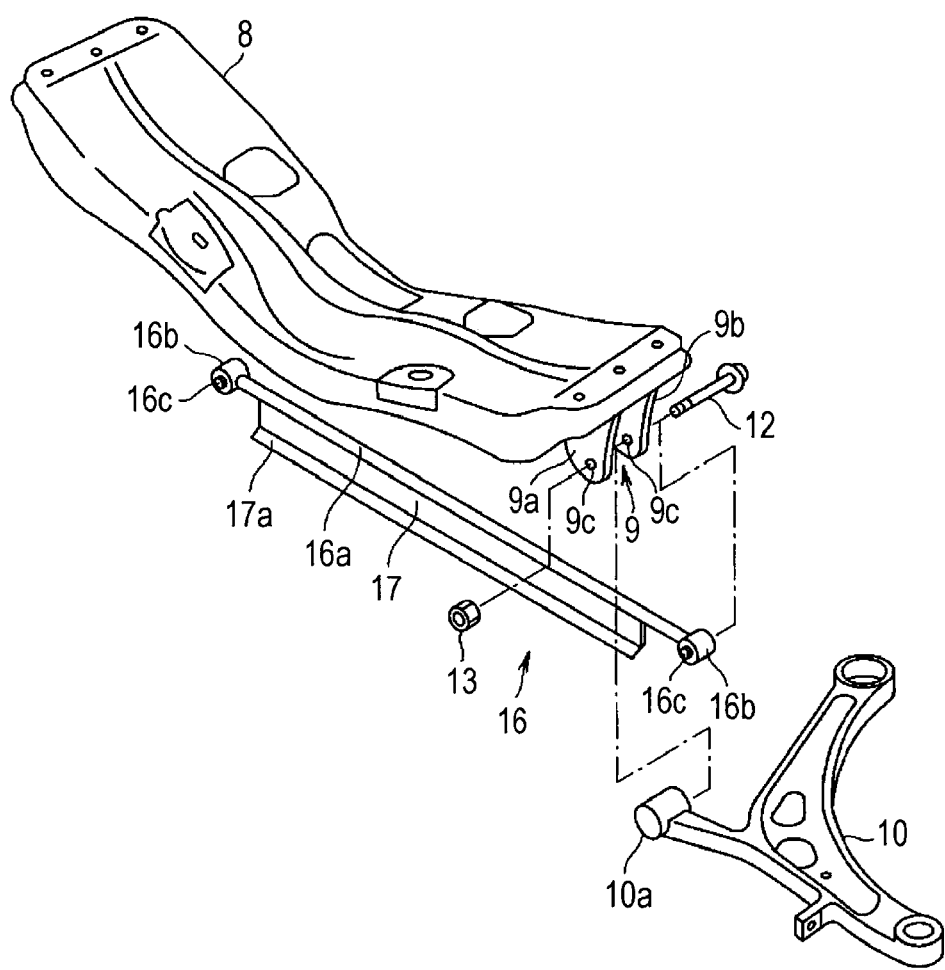
FIG. 2 is an exploded perspective view showing an assembly state of the lower bar.

FIGS. 1 and 2 illustrate a first embodiment of the present invention. In this embodiment, a suspension cross member is stiffened by using a lower bar serving as a stiffening member.

Reference numeral 1 in the drawing denotes a front vehicle-body section, and this front vehicle-body section 1 is provided with an engine room 2. The left and right sides of the engine room 2 are partitioned by front-wheel aprons 3, which are components of a vehicle-body frame. The front-wheel aprons 3 are respectively connected to a pair of left and right front side frames 5 that extend in the front-rear direction of the vehicle body. A rear section of each front-wheel apron 3 is provided with a strut tower 6. Each strut tower 6 accommodates a strut-type suspension (hereinafter simply referred to as "suspension") 7. An upper section of the suspension 7 is supported by a strut support portion 6a, formed at an upper section of the strut tower 6, via a strut upper mount 7a.

A suspension cross member (simply referred to as "cross member" hereinafter) 8 is disposed at a position that is below the engine room 2 and that is substantially aligned with the suspensions 7 in the vehicle-width direction. As shown in FIG. 2, the cross member 8 is a sheet-metal product whose periphery is bent downward and that is inclined substantially upward from the center toward opposite ends thereof in the vehicle-width direction. The cross member 8 has unique hysteresis characteristics.

The upper surfaces of the opposite ends of the cross member 8 in the vehicle-width direction are fixed to the front side frames 5 via fastening members, such as bolts and nuts. A rear section of an engine (not shown) is mounted on the upper surface of the cross member 8 via an engine mount (not shown).

Furthermore, left and right arm support portions 9 respectively protrude from the lower surfaces of the opposite ends of the cross member 8 in the vehicle-width direction. Each of the left and right arm support portions 9 includes a pair of brackets 9a and 9b facing each other in the front-rear direction with a predetermined distance therebetween. The brackets 9a and 9b have bolt through-holes 9c extending therethrough. An outer cylinder portion 10a fixed to a base of a suspension lower arm (hereinafter simply referred to as "lower arm") 10 is interposed between the brackets 9a and 9b of each pair. Each lower arm 10 supports a lower section of the corresponding suspension 7 via a hub housing (not shown), and also rotatably supports a wheel hub (not shown) that secures a corresponding front wheel 11.

A bush (not shown) is press-fitted within the outer cylinder portion 10a of each lower arm 10. A shaft portion of a bolt 12 (hereinafter, collectively referred to as "bolt shaft 12"), which is inserted from the outside through the bolt through-holes 9c in the brackets 9a and 9b of each pair, extends through the bush, and the bolt shaft 12 is fastened by a nut 13.

When the vehicle runs along a curved road, such as during cornering or slaloming, lateral acceleration is generated on the vehicle due to a centrifugal force. As a result, a compressive load is applied to the suspension 7 at the outer turning side, whereas a tensile load is applied to the suspension 7 at the inner turning side. During slaloming, the compressive load and she tensile load are alternately applied to the left and right suspensions 7 every time the steering wheel is turned. If these loads cannot be fully absorbed by the suspensions 7 alone, a load that bends the vehicle body inward or outward in the vehicle-width direction is applied to the vehicle body via the strut towers 6 and the lower arms 10. In this case, if the rigidity of the vehicle body (corresponding to the rigidity of the cross member 8 in this embodiment) is low, a phase lag in bending deformation of the vehicle body (vehicle-body hysteresis) occurs significantly, resulting in reduced steering responsiveness (vehicle tracking properties). On the other hand, increasing the rigidity of the vehicle body leads to an increased sense of ruggedness when the vehicle is running, thus resulting in reduced riding comfort.

In light of this, two spaced-apart positions of the cross member 8 are connected to each other using a main bar portion 16a of a lower bar 16 serving as a stiffening member in this embodiment so that the vehicle body can be stiffened, thereby satisfying both steering responsiveness and riding comfort.

The main bar portion 16a is a hollow pipe composed of an aluminum alloy, steel, or the like and having a circular shape or an oval shape in cross section. In this embodiment, the main bar portion 16a is substantially linear. Ring-shaped connection portions 16b are fixed to opposite ends of the main bar portion 16a. Each bolt shaft 12 extending through the bolt through-hole 9c formed in the corresponding bracket 9b is inserted into a through-hole 16c formed in the corresponding connection portion 16h, and the connection portion 16b is fastened to an outer surface of the bracket 9b at the rear side of the vehicle body. Although the main bar portion 16a is shown as being linear in FIG. 2, the shape of the main bar portion 16a is not limited to this and may alternatively be an arch shape or a trapezoidal shape formed by bending the center thereof into a convex shape toward the front or the rear of the vehicle body.

The distance between the through-holes 16c formed in the connection portions 16b fixed to the opposite ends of the lower bar 16 is equal to the distance between the bolt through-holes 9c in the brackets 9a and 9b fixed to the opposite ends of the cross member 8. Therefore, the lower bar 16 can be fixed to the cross member 8 in a free state without applying a preload (kg/mm) thereto.

A wind-receiving plate 17 with a predetermined width in the vehicle-width direction is fixed to the main bar portion 16a of the lower bar 16. The wind-receiving plate 17 hangs downward from the main bar portion 16a, and a lower end serving as a free end of the wind-receiving plate 17 is provided with a flap portion 17a. The flap portion 17a is formed by being bent downward at an angle toward the front of the vehicle body. Downward tension is applied to the main bar portion 16a due to traveling wind striking the flap portion 17a.

Next, the operation of the vehicle-body stiffening device having the above configuration will be described. When the vehicle starts running, traveling wind from the front of the vehicle body is introduced into the engine room 2 through wind-introducing holes formed in a front grill and a front bumper at the front vehicle-body section. A portion of the traveling wind travels between the vehicle body and the road surface so as to escape to the rear of the vehicle body along a floor panel. On the other hand, the traveling wind flowing between the bottom of the vehicle body and the road surface from below an air dam formed below the front bumper also travels between the floor panel and the road surface toward the rear of the vehicle body so as to escape rearward.

In this embodiment, the arm support portions 9 formed at the opposite ends of the cross member 8 are connected to each other by the lower bar 16, and the wind-receiving plate 17 hangs downward from the main bar portion 16a of the lower bar 16. Therefore, when the vehicle is running, a portion of the traveling wind flowing between the bottom surface of the vehicle body and the road surface strikes the wind-receiving plate 17. A wind pressure (N/m$^2$) received by the wind-receiving plate 17 increases in proportion to the square of a vehicle speed (wind speed) (m/s). Since the wind pressure changes in proportion to the air density, the wind pressure decreases with increasing temperature or increases with decreasing temperature even when the wind speed is constant.

Because the main bar portion 16a is linear in this embodiment, the main bar portion 16a is biased by the traveling-wind pressure received by the wind-receiving plate 17 and the flap portion 17a, whereby bending stress is generated rearward and downward of the vehicle body. Since the connection portions 16b fixed to the opposite ends of the main bar portion 16a are supported by the bolt shafts 12 that support the outer cylinder portions 10a of the lower arms 10, a preload (tensile load) that pulls the cross member 8 inward in the vehicle-width direction is generated at the lower side of the cross member 8 due to the bending stress applied to the main bar portion 16a.

Because the wind pressure received by the wind-receiving plate 17 increases in proportion to the square of the vehicle speed (m/s), as mentioned above, a higher preload is generated in the main bar portion 16a during a high-speed running mode in which the vehicle-body hysteresis is large. Thus, bending deformation of the cross member 8 in the vehicle-width direction is reduced. In particular, the vehicle-body hysteresis is effectively reduced when the vehicle is cornering or slaloming at high speed, thereby achieving improved steering responsiveness and good steering stability.

The vehicle-body hysteresis is substantially 0 (%) when the vehicle is at a stop, and it is therefore not necessary to apply the preload to the main bar portion 16a. Since the preload is generated by the traveling-wind pressure in this embodiment, the preload is 0 (kg/mm) when the vehicle is at a stop, thereby reducing the load on the vehicle body. Moreover, since the preload generated in the main bar portion 16a is 0 (%) when the vehicle is at a stop, the lower bar 16 can be readily attached or detached, thereby facilitating the assembly process as well as the replacement process.

Likewise, because the vehicle-body hysteresis and the preload generated by the main bar portion 16a both change due to the vehicle speed, a preload corresponding to the vehicle-body hysteresis can be generated in the main bar portion 16a, thereby minimizing the load on the vehicle body. Therefore, during a low-speed to mid-speed running mode in which the traveling-wind pressure is low, an unnecessary preload is not applied to the vehicle body from the main bar portion 16a so that good riding comfort can be ensured. As a result, good riding comfort during the low-speed no mid-speed running mode and improved steering responsiveness during the high-speed running mode due to reduced vehicle-body hysteresis can both be achieved.

Supposing that the main bar portion 16a of the lower bar 16 has a curved shape or a trapezoidal shape formed by being bent into a convex shape toward the front of the vehicle body, when bending stress is generated in the main bar portion 16a due to the traveling-wind pressure, a preload that tries to expand the main bar portion 16a outward in the vehicle-width direction is generated in the main bar portion 16a. Hence, a preload (pressing load) that tries to press the lower arms 10, supported by the opposite ends of the cross member 8, away from each other in the vehicle-width direction is generated, thereby increasing the rigidity of the vehicle body. Whether to select the tensile load or the pressing load as the preload to be generated in the main bar portion 16a is determined by analyzing the strength of the vehicle to which the lower bar 16 is to be installed by computer-aided engineering (CAE) or the like.

Second Embodiment

Figure 3:
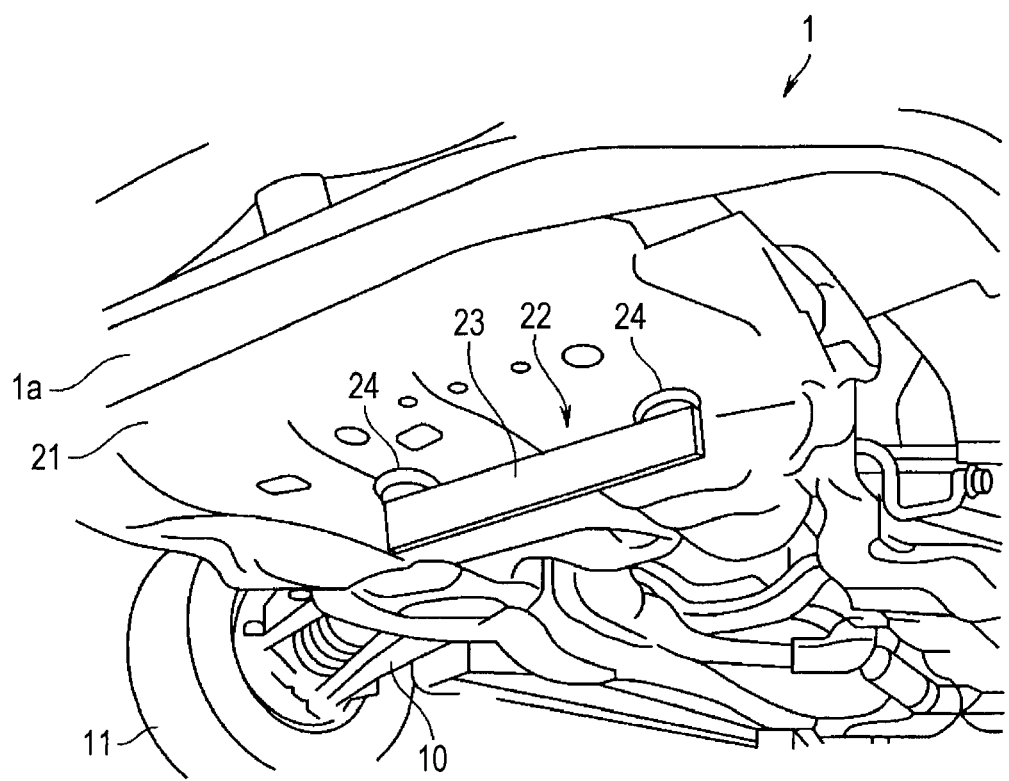
FIG. 3 is a bottom perspective view showing a state where a wind-receiving plate according to a second embodiment is provided at an engine undercover.
Figure 4A:
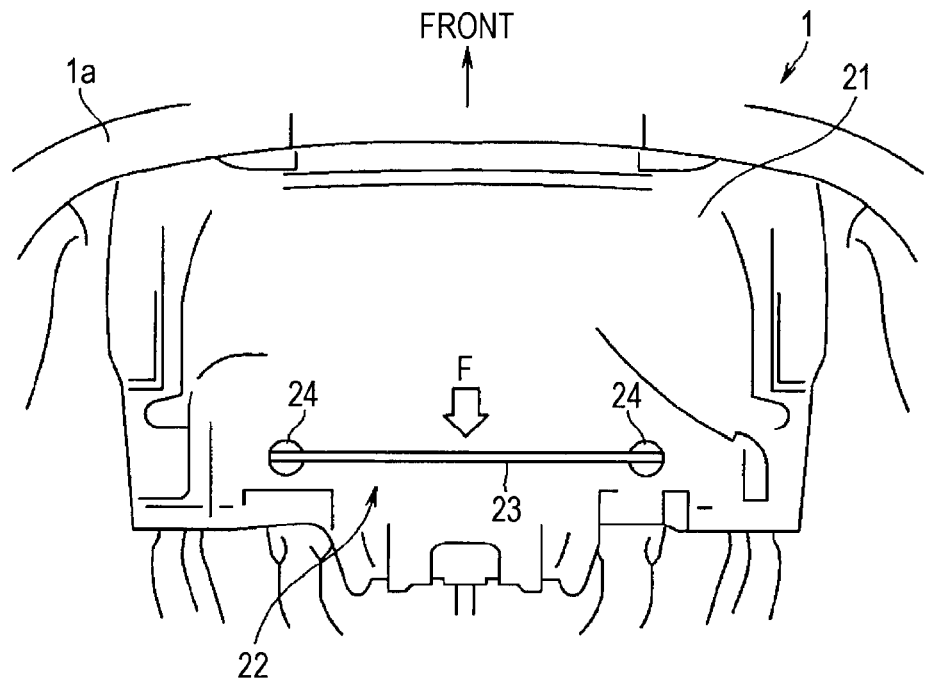
FIG. 4A is a bottom view of FIG. 3.
Figure 4B:
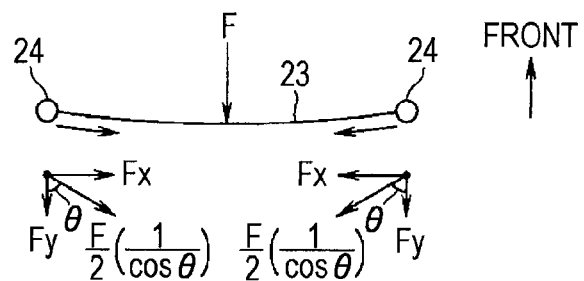
FIG. 4B illustrates a preload generated by a traveling-wind pressure received by the wind-receiving plate.
Figure 4C:
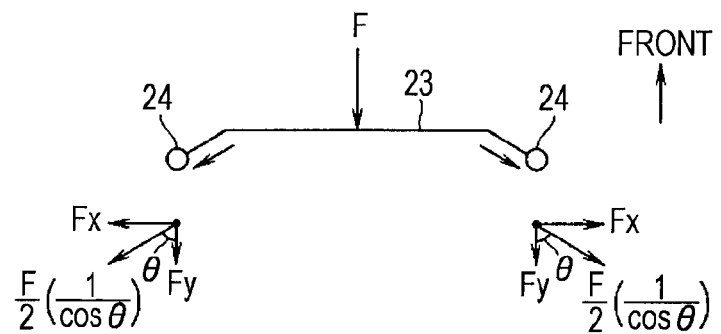
FIG. 4C illustrates a preload generated by a traveling-wind pressure received by a wind-receiving plate according to another embodiment.

FIGS. 3 to 4C illustrate a second embodiment of the present invention. In contrast to the first embodiment in which the two lower positions of the cross member 8 are connected to each other by the stiffening member (lower bar 16), an engine undercover (hereinafter simply referred to as "undercover") 21 is provided with a wind-receiving plate 23 in this embodiment so that the undercover 21 functions as the stiffening member. Therefore, a stiffening unit 22 according to the second embodiment is constituted of the undercover 21 and the wind-receiving plate 23. Components that are the same as those in the first embodiment are given the same reference numerals, and descriptions thereof will be omitted below.

The undercover 21 covers the front lower surface of the engine room 2 (see FIG. 1). The undercover 21 has a front edge that is fixed to a front fender 1a, left and right edges that are fixed to the front side frames 5 (see FIG. 1), and a rear edge that is fixed to the cross member 8. The undercover 21 is composed of synthetic resin, and is bent as a result of receiving a tensile load or a pressing load in the vehicle-width direction. The two front side frames 5 correspond to spaced-apart regions according to the present invention.

The wind-receiving plate 23 is disposed linearly in the vehicle-width direction at a rear section of the undercover 21. Opposite ends of the wind-receiving plate 23 are fixed to the bottom surface of the undercover 21 via mounts 24. The mounts 24 are disposed adjacent to fastening positions (bolt-fastening positions) between the undercover 21 and the front side frames 5.

With such a configuration, when the traveling wind generated as the vehicle is running strikes the wind-receiving plate 23 from the front of the vehicle body, as shown in FIG. 4A, a traveling-wind pressure F at that time causes bending stress to be generated in the wind-receiving plate 23 toward the rear of the vehicle body, as shown in FIG. 4B.

As shown in FIG. 4B, assuming that the traveling-wind pressure F is concentrated in, for example, the center of the wind-receiving plate 23, a force component F/2 (1/cos θ) is generated at each of the mounts 24 provided at the opposite ends of the wind-receiving plate 23. The force component F/2·(1/cos θ) generated at each mount 24 is a resultant force of a vector Fx acting inward in the vehicle-width direction and a vector Fy acting toward the rear of the vehicle. The vector Fx biases the undercover 21 via each mount 24 so that a preload (tensile load) acting inward in the vehicle-width direction is generated in the undercover 21.

The undercover 21 is fixed to the front side frames 5, provided at the left and right sides of the vehicle body, via bolts or the like and is provided with the mounts 24 at positions adjacent to the bolt-fastening positions. Thus, the preload (tensile load) applied to the undercover 21 increases the rigidity of the vehicle body especially when the vehicle is running at high speed, thereby reducing the vehicle-body hysteresis and thus improving the steering responsiveness. Furthermore, since the undercover 21 functions as the stiffening member in this embodiment, the number of components can be reduced.

In this case, as shown in FIG. 4C, the wind-receiving plate 23 may be formed in a trapezoidal shape that protrudes toward the front of the vehicle body. If the wind-receiving plate 23 has a trapezoidal shape that protrudes toward the front of the vehicle body, the opposite ends of the wind-receiving plate 23 generate a preload (pressing load) that tries to expand the undercover 21 outward in the vehicle-width direction via the mounts 24 when the traveling-wind pressure F strikes the wind-receiving plate 23.

Since the undercover 21 is provided with an area, such as a slit, that permits movement in the vehicle-width direction, the undercover 21 tries to expand outward in the vehicle-width direction. Due to the preload, the rigidity between the two side frames 5 of the vehicle body is increased via the undercover 21. In this case, a flap portion (17a) similar to that in the first embodiment may be formed at a lower section of the wind-receiving plate 23.

Furthermore, the undercover 21 and the wind-receiving plate 23 may be formed as separate components, or the wind-receiving plate 23 may be formed integrally with the bottom surface of the undercover 21. Moreover, the wind-receiving plate 23 may be fixed to the undercover 21 via an additional component, such as a bracket. If the undercover 21 and the wind-receiving plate 23 are formed as separate components, the undercover 21 and the wind-receiving plate 23 may be integrally fixed to vehicle-body frame members, such as the front side frames 5 and the cross member 8, by, for example, fastening them together.

Third Embodiment

Figure 6:
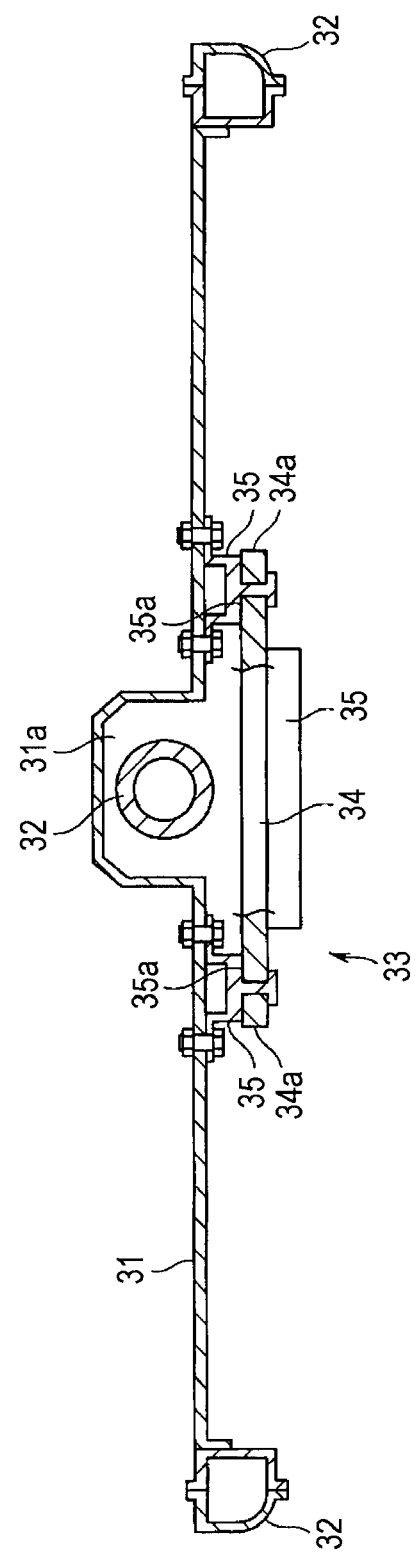
FIG. 6 is a front view of FIG. 5.

FIGS. 5 and 6 illustrate a third embodiment of the present invention. In this embodiment, an area between two opposite positions, in the vehicle-width direction, of a floor tunnel 31a formed in a floor panel 31 of the vehicle body is stiffened by a floor tunnel bar 33 serving as a stiffening member so that the vehicle-body hysteresis occurring due to bending deformation of the floor tunnel 31a can be reduced.

The floor tunnel 31a accommodates a propeller shaft 32 that transmits a driving force of the engine to the rear wheels, and is formed by forming a substantially central part, in the vehicle-width direction, of the bottom side of the floor panel 31 into a concave shape extending in the front-rear direction of the vehicle body. A transmission that changes the speed of the driving force from the engine and transmits the driving force to a drive shaft is accommodated in a front section of the floor tunnel 31a, that is, a position corresponding to a center console disposed in a vehicle cabin, and the drive shaft is connected to the propeller shaft 32. The floor tunnel 31a sometimes accommodates an exhaust-system component (such as an exhaust pipe).

The floor tunnel bar 33 that reinforces the floor tunnel 31a includes a main bar portion 34 serving as a stiffening member disposed across the floor tunnel 31a in the vehicle-width direction, and a wind-receiving plate 35 hanging downward from the main bar portion 34. The main bar portion 34 is a hollow pipe composed of an aluminum alloy, steel, or the like and having a circular shape or an oval shape in cross section. In this embodiment, the main bar portion 34 is substantially linear. Opposite ends of the main bar portion 34 are provided with fixation portions 34a.

Bar holders 36 are fixed at positions opposite each other in the vehicle-width direction with the floor tunnel 31a therebetween. The bar holders 36 are each formed in a shape of a hat. In each hat-shaped bar holder 36, bearing surfaces formed at opposite sides of an attachment surface 36a are fixed to the floor panel 31. The fixation portions 34a formed at the opposite edges of the main bar portion 34 are connected and fixed to the attachment surfaces 36a of the bar holders 36 by, for example, caulking.

With such a configuration, the traveling-wind pressure F received by the wind-receiving plate 35 increases with increasing vehicle speed so that the main bar portion 34 becomes biased, thereby generating bending stress in the main bar portion 34 toward the rear of the vehicle body. This causes a preload (tensile load) that tries to decrease the distance between sidewalls of the floor tunnel 31a to occur in the main bar portion 34 via the bar holders 36. As a result, the rigidity of the vehicle body is increased especially when the vehicle is running at high speed, thereby reducing the vehicle-body hysteresis, which can occur due to bending deformation of the floor tunnel 31a, and thus improving the steering responsiveness.

The aforementioned floor tunnel bar 33 may be provided in a plurality for the floor tunnel 31a at preset intervals in the front-rear direction of the vehicle body. Moreover, a flap portion (17a) similar to that in the first embodiment may be formed at a lower section of the wind-receiving plate 35.

Fourth Embodiment

Figure 7:
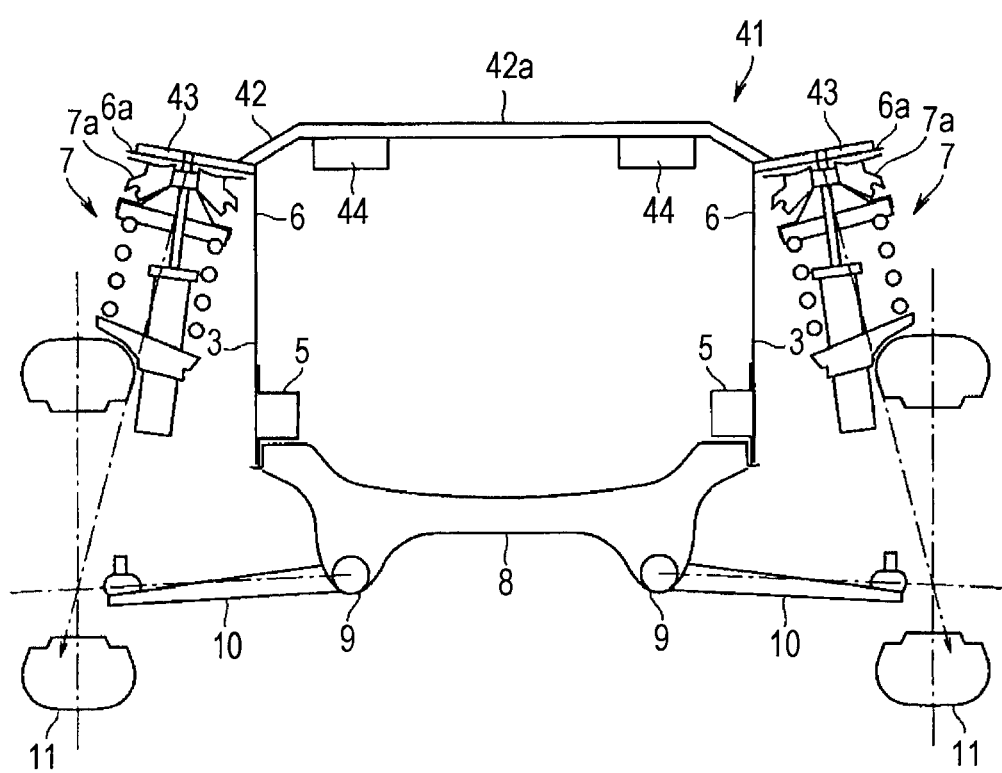
FIG. 7 is a front view showing a state where strut towers are connected to each other by a strut tower bar according to a fourth embodiment.
Figure 8A:
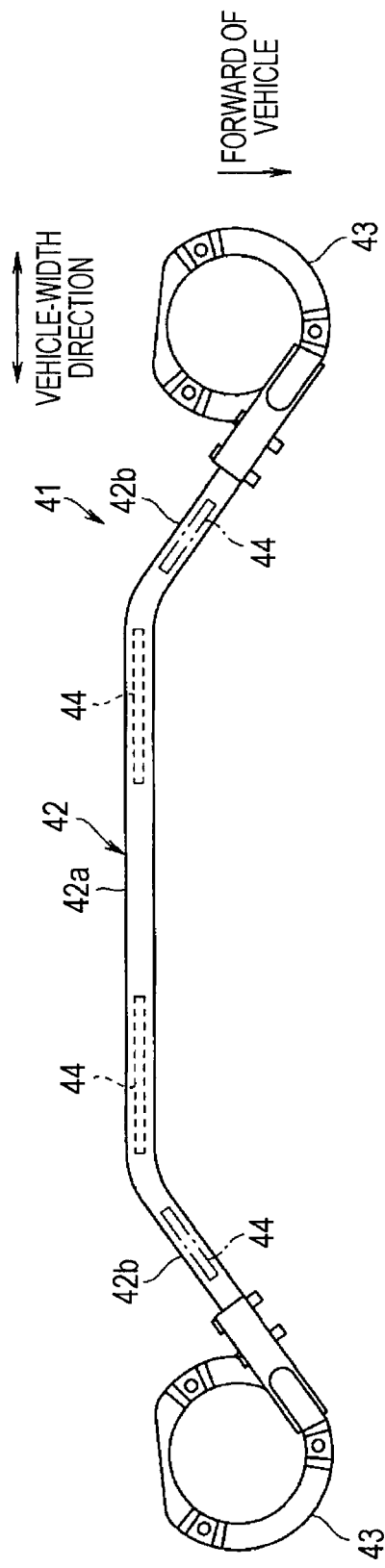
FIG. 8A is a plan view of the strut tower bar.
Figure 8B:
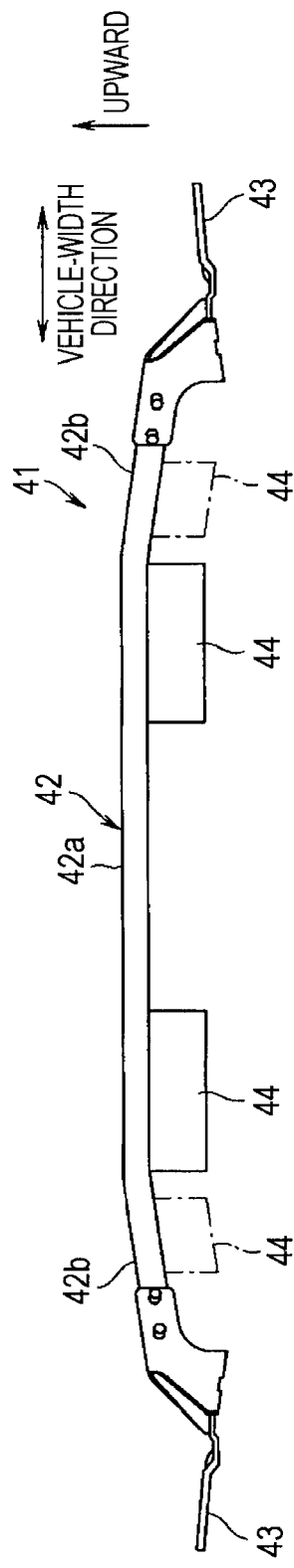
FIG. 8B is a front view of the strut tower bar.
Figure 9:
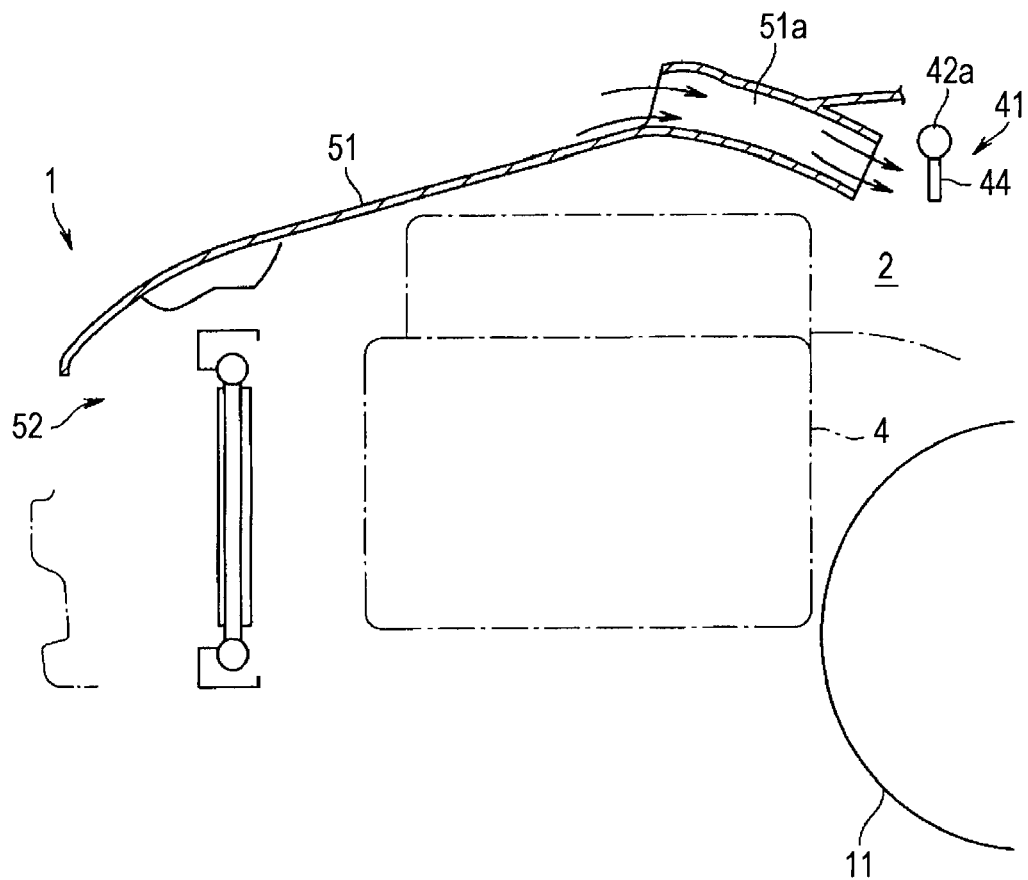
FIG. 9 is a schematic cross-sectional view showing a state where traveling wind is guided to wind-receiving plates provided at the strut tower bar.

FIGS. 7 to 9 illustrate a fourth embodiment of the present invention. In this embodiment, wind-receiving plates 44 are fixed to a main tower-bar portion 42 of a strut tower bar 41 serving as a stiffening member. Ring-shaped brackets 43 are fixed to opposite ends of the main tower-bar portion 42 of the strut tower bar 41.

The main tower-bar portion 42 is a hollow pipe composed of an aluminum alloy, steel, or the like and having a circular shape or an oval shape in cross section. In this embodiment, the main tower-bar portion 42 is formed in a trapezoidal shape that protrudes upward at an angle toward the rear of the vehicle body.

The ring-shaped brackets 43 are fastened together with the strut upper mounts 7a onto the strut support portions 6a formed on the upper surfaces of the strut towers 6 As shown in FIGS. 8A and 8B, the wind-receiving plates 44 hang downward from symmetrical positions near opposite ends of an upper segment 42a of the main tower-bar portion 42 formed in a trapezoidal shape by bending.

As shown in FIG. 9, the upper segment 42a of the main tower-bar portion 42 provided in the strut tower bar 41 is located obliquely above and behind an engine 4 disposed within the engine room 2 and is disposed relatively near an inner surface of a front hood 51 that covers the upper section of the engine room 2. The front hood 51 is provided with a traveling-wind duct 51a that guides the traveling wind to the wind-receiving plates 44.

With such a configuration, a portion of the traveling wind generated as the vehicle is running is guided to the traveling-wind duct 51a so as to strike the wind-receiving plates 44. Then, the traveling-wind pressure received by the wind-receiving plates 44 biases the upper segment 42a of the main tower-bar portion 42, thereby generating bending stress in the main tower-bar portion 42 toward the rear of the vehicle body.

As a result, a preload (tensile load) acting inward in the vehicle-width direction between the two strut towers 6 is generated in the main tower-bar portion 42 due to the bending stress, whereby the rigidity of the vehicle body is increased especially when the vehicle is running at high speed. Thus, the vehicle-body hysteresis occurring due to bending deformation of the strut towers 6 and the vehicle body connected to the strut towers 6 is reduced, thereby achieving good steering responsiveness.

In this case, the traveling-wind duct may be formed at the inner surface of the front hood 51 so that the traveling wind taken in through a front grill 52 can be guided to the wind-receiving plates 44 by using the traveling-wind duct. Alternatively, if the traveling wind taken in through an intercooler intake duct can be guided to the wind-receiving plates 44, the intercooler intake duct can be used as the traveling-wind duct.

Furthermore, as shown with dashed lines in FIG. 8A and 8B, the wind-receiving plates 44 may be fixed to oblique segments 42b that extend continuously from the opposite ends of the upper segment 42a of the main tower-bar portion 42. For example, in an engine equipped with a turbocharger, turbocharger peripheral components, such as an intercooler, are disposed at the upper section of the engine 4. Therefore, the space between the upper section of the engine room 2 and the front hood 51 is small. This often makes it difficult to dispose the main tower-bar portion 42 across the upper section of the engine 4.

In that case, the main tower-bar portion 42 needs to be accommodated in a laid position in a gap between the rear of the intercooler and a front louver (not shown), thus making it difficult for the traveling wind so strike the upper segment 42a of the main tower-bar portion 42 from the front. In light of this, the wind-receiving plates 44 are provided at the oblique segments 42b formed at the opposite ends of the upper segment 42a.

Figure 10:
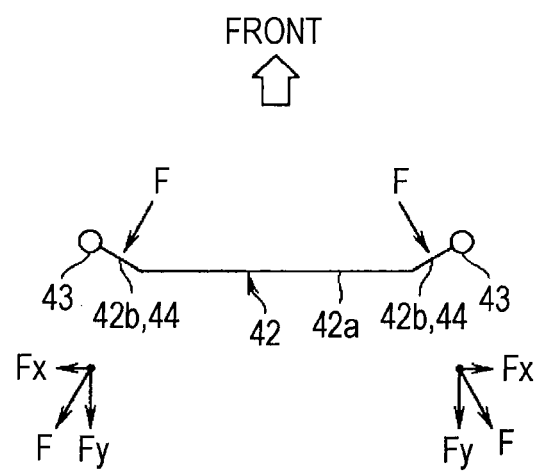
FIG. 10 illustrates a preload generated by the strut tower bar.

By providing the wind-receiving plates 44 at the oblique segments 42b, the traveling wind can be guided relatively easily to the wind-receiving plates 44. In this case, as shown in FIG. 10, if the traveling-wind pressure F is applied orthogonally to each wind-receiving plate 44, for example, the traveling-wind pressure F is divided into a vector Fx acting outward in the vehicle-width direction and a vector Fy acting toward the rear of the vehicle. Due to the vector Fx acting outward in the vehicle-width direction, a preload (pressing load) that tries to expand the strut tower bar 41 outward in the vehicle-width direction is generated at each of the opposite ends thereof.

The main tower-bar portion 42 may alternatively be formed in a trapezoidal shape that protrudes toward the front of the vehicle body. In that case, due to the traveling-wind pressure received by the wind-receiving plates 44, the strut tower bar 41 causes a preload (pressing load) that tries to expand the strut towers 6 outward in the vehicle-width direction to be generated between the strut towers 6, whereby the rigidity of the vehicle body is increased. As a further alternative, a flap portion (17a) similar to that in the first embodiment may be formed at a lower section of each of the wind-receiving plates 44.

It should be noted that the installation area of the stiffening member in each of the above embodiments is only an example. The stiffening member can be attached to areas that need to be stiffened based on a CAE analysis (such as a lower radiator panel or a toe-board cross member), and the shape of the wind-receiving plate is not limited. Furthermore, in addition to the fourth embodiment, the traveling-wind duct may also be provided in each of the first to third embodiments so that the traveling wind can be actively guided to each wind-receiving plate.

What is claimed is:

1. A vehicle-body stiffening device comprising:
a stiffening member that connects spaced-apart regions of a vehicle body; and
a wind-receiving plate that is fixed to the stiffening member and that receives a traveling-wind pressure, the wind-receiving plate being configured to bias the stiffening member by receiving the traveling-wind pressure so as to generate a preload between the spaced-apart regions,
wherein a free end of the wind-receiving plate is provided with a flap portion that is inclined toward a direction from which the traveling-wind pressure is received.

2. The vehicle-body stiffening device according to claim 1, wherein the spaced-apart regions are arm support portions that are provided at left and right sides, in a vehicle-width direction, of a lower section of a suspension cross member and that support a suspension lower arm, and
wherein the stiffening member is a lower bar that connects the left and right arm support portions.

3. The vehicle-body stiffening device according to claim 1, wherein the spaced-apart regions are a pair of side frames disposed at left and right sides in a vehicle-width direction,
wherein the stiffening member is an undercover that covers a lower surface of an engine room and that is fixed to the side frames, and
wherein opposite ends of the wind-receiving plate are fixed to a bottom surface of the undercover.

4. The vehicle-body stiffening device according to claim 1, wherein the spaced-apart regions are two opposite positions, in a vehicle-width direction, that flank a floor tunnel formed in a floor panel in a front-rear direction of the vehicle body, and
wherein the stiffening member is a main bar portion that connects the two opposite positions.

5. The vehicle-body stiffening device according to claim 1, wherein the spaced-apart regions are strut towers disposed at left and right sides in a vehicle-width direction, and
wherein the stiffening member is a strut tower bar that connects the strut towers.

6. The vehicle-body stiffening device according to claim 1, wherein the vehicle body is provided with a traveling-wind duct that guides traveling wind toward the wind-receiving plate.

* * * * *